US005333088A

United States Patent [19]

Sweet

[11] Patent Number: 5,333,088

[45] Date of Patent: Jul. 26, 1994

[54] DATA TRANSMISSION SYSTEM

[75] Inventor: George A. Sweet, Ashington, United Kingdom

[73] Assignee: British Gas plc, England

[21] Appl. No.: 804,660

[22] Filed: Dec. 11, 1991

[30] Foreign Application Priority Data

Dec. 12, 1990 [GB] United Kingdom ................. 9026923

[51] Int. Cl.$^5$ ........................ H04J 14/02; H04B 10/12

[52] U.S. Cl. .................................... 359/144; 359/124; 359/158; 359/167

[58] Field of Search ................ 359/124, 144, 168–171, 359/132, 158, 167

[56] References Cited

U.S. PATENT DOCUMENTS

| | | | |
|---|---|---|---|
| 4,142,137 | 2/1979 | Umpleby | 307/116 |
| 4,293,823 | 10/1981 | Hochberg | 330/260 |
| 4,420,840 | 12/1983 | Livermore | 359/144 |
| 4,434,510 | 2/1984 | Lemelson | 359/168 |
| 4,707,823 | 11/1987 | Holdren et al. | 370/77 |
| 4,710,977 | 12/1987 | Lemelson | 359/171 |
| 4,722,081 | 1/1988 | Fujito | 359/132 |

FOREIGN PATENT DOCUMENTS

| | | | |
|---|---|---|---|
| 0053790 | 6/1982 | European Pat. Off. | 359/168 |
| 0386965 | 9/1990 | European Pat. Off. | 359/171 |
| 1238198 | 7/1971 | United Kingdom . | |
| 1341409 | 12/1973 | United Kingdom . | |
| 1576995 | 10/1980 | United Kingdom . | |
| 2222037 | 8/1988 | United Kingdom . | |

*Primary Examiner*—Leslie Pascal
*Attorney, Agent, or Firm*—Larson and Taylor

[57] ABSTRACT

The system enables data from analogue state sensors S1 to S16, four of which may be direct frequency sensors, located in a ZONE 0 (1) environment, to be transmitted by a master transmitter 10 via a fibre optic data link 16 to a master receiver 14. The master receiver is located in a safe environment. The master transmitter comprises a power restrictor unit 18 which has for each data channel a power supply and also a power supply for the printed circuit-board (pcb) of the master transmitter. The master transmitter is located in a ZONE 1 environment. The analogue or state data are voltages which are converted by voltage-to-frequency converters mounted on the pcb and passed to the multiplexer of the master transmitter. The multiplexer feeds the fibre optic link and a demultiplexer at the master receiver reproduces the frequencies. The master receiver re-converts the frequencies to voltage signals.

6 Claims, 6 Drawing Sheets

68
Vin
66
64
AMP
62
V/F
38
Vo
Fo
0V
68
Vin
66
64
AMP
62
V/F
Vo
Fo
0V
78
SIGNAL ATTENUATION
F
0V
16 CHANNEL
MULTIPLEXER

DATA TRANSMISSION SYSTEM

BACKGROUND

The invention relates to data transmission systems.

SUMMARY OF THE INVENTION

A data transmission system, according to the invention, includes a master transmitter and a master receiver connected by a fibre optic data link. The master transmitter has a power restrictor unit, secondary circuits and a multiplexer and the master receiver has a demultiplexer. The multiplexer receives frequency signals derived by the secondary circuits and representing analogue outputs from intrinsically safe process loop transmitter primary circuits or equivalent state input primary circuits. The power restrictor unit provides energisation for said primary and said secondary circuits.

Preferably, the frequency signals are produced by voltage-to-frequency converters in the secondary circuits, each converter being driven by a voltage originally developed across a respective resistor in a respective primary circuit. The power restrictor unit have a respective power supply for each of the primary circuits. The said power supply has two sides, one of which is connected to one end of the primary circuit and the other side of said supply being connected to one end of the resistor forming the other end of the primary circuit.

BRIEF DESCRIPTION OF THE DRAWINGS

A data transmission system will now be described by way of example as an embodiment of the invention with reference to the accompanying drawings, in which.

DETAILED DESCRIPTION OF THE PREFERRED EMBODIMENTS

Figure 1:
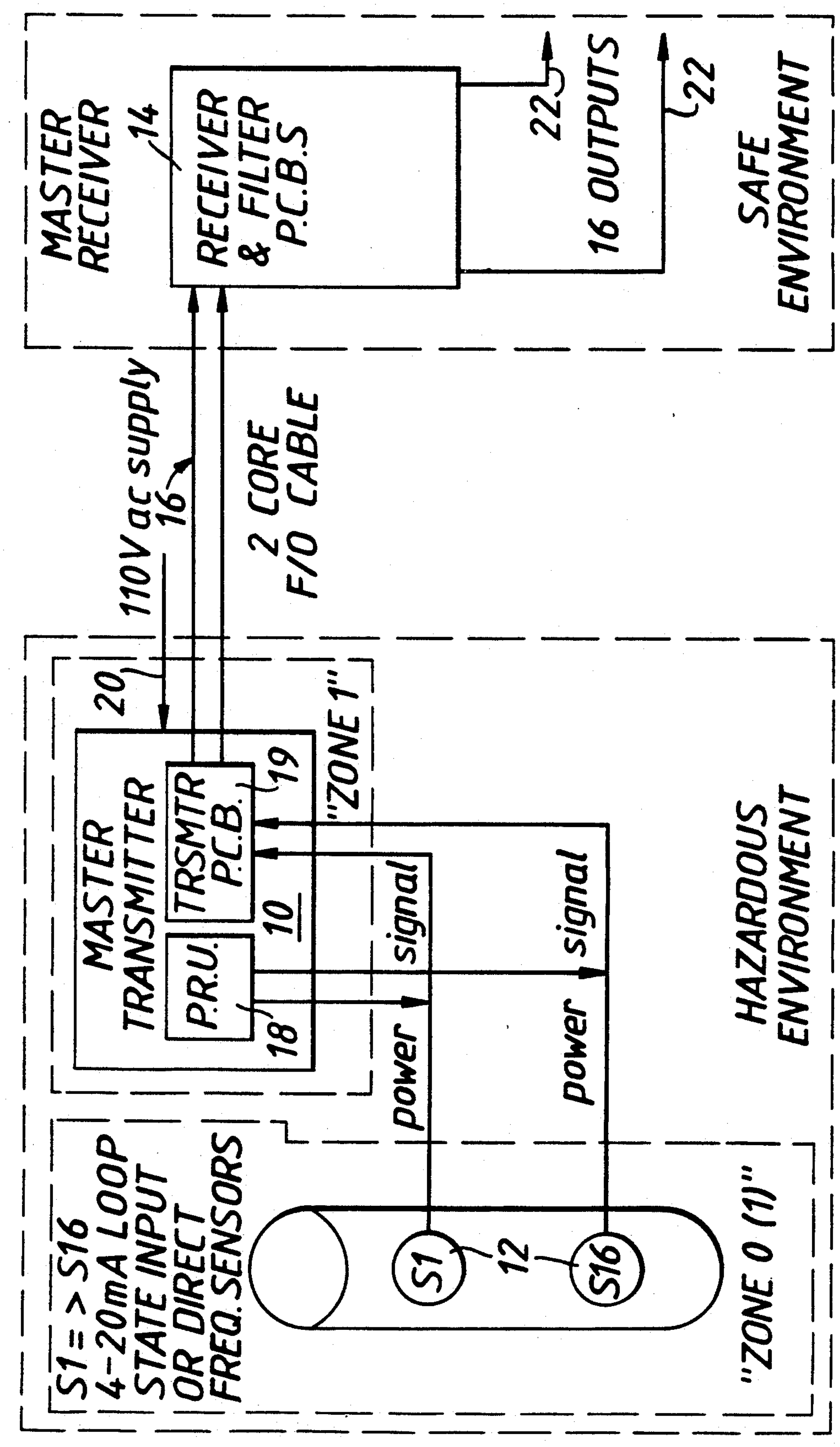
FIG. 1 is an overall block schematic diagram showing the total system.

FIG. 1 shows a data transmission system in which a master transmitter 10 gathers data from up to sixteen analogue or state sensors 12 and transmits the data to a master receiver 14 which may be of the order up to 2 kilometers distant. The master transmitter 10 and the master receiver are connected by a fibre optic data link 16.

The master transmitter comprises a power restrictor unit 18, a master transmitter printed circuit-board (pcb) a dual 5.2 v dc power supply unit (not shown) and a precision resistor unit (not shown as such but the resistors are shown at 68, FIG. 3). The power restrictor unit 18, which energises loop transmitters (FIG. 3) each associated with one of the sensors 12, also energises the master transmitter printed circuit-board 19. The power restrictor unit 18 is energised from the mains 20.

The master receiver 14 includes receiver and filter pcb's and has up to sixteen outputs 22 corresponding to the sixteen input sensors 12.

The last 4 of the sensors 12 can be replaced, if desired, by direct frequency sensors (FIG. 3) energised by an independent isolated power source instead of being energised by the power restrictor unit.

The master transmitter 10 can be mounted in a ZONE 1 hazardous area and can provide power for up to sixteen 4–20 milliampere Intrinsically Safe (IS) analogue or state sensors 12 located in a ZONE 0 hazardous area. For definitions of ZONE 0 and ZONE 1 see British Standard 5345 Part 2.

The master receiver must be located in a "safe-area", normally a control room. The measured data is transmitted over an IS fibre optic data link 16. This can be routed with power cables without reduction of data integrity.

Figure 2A:
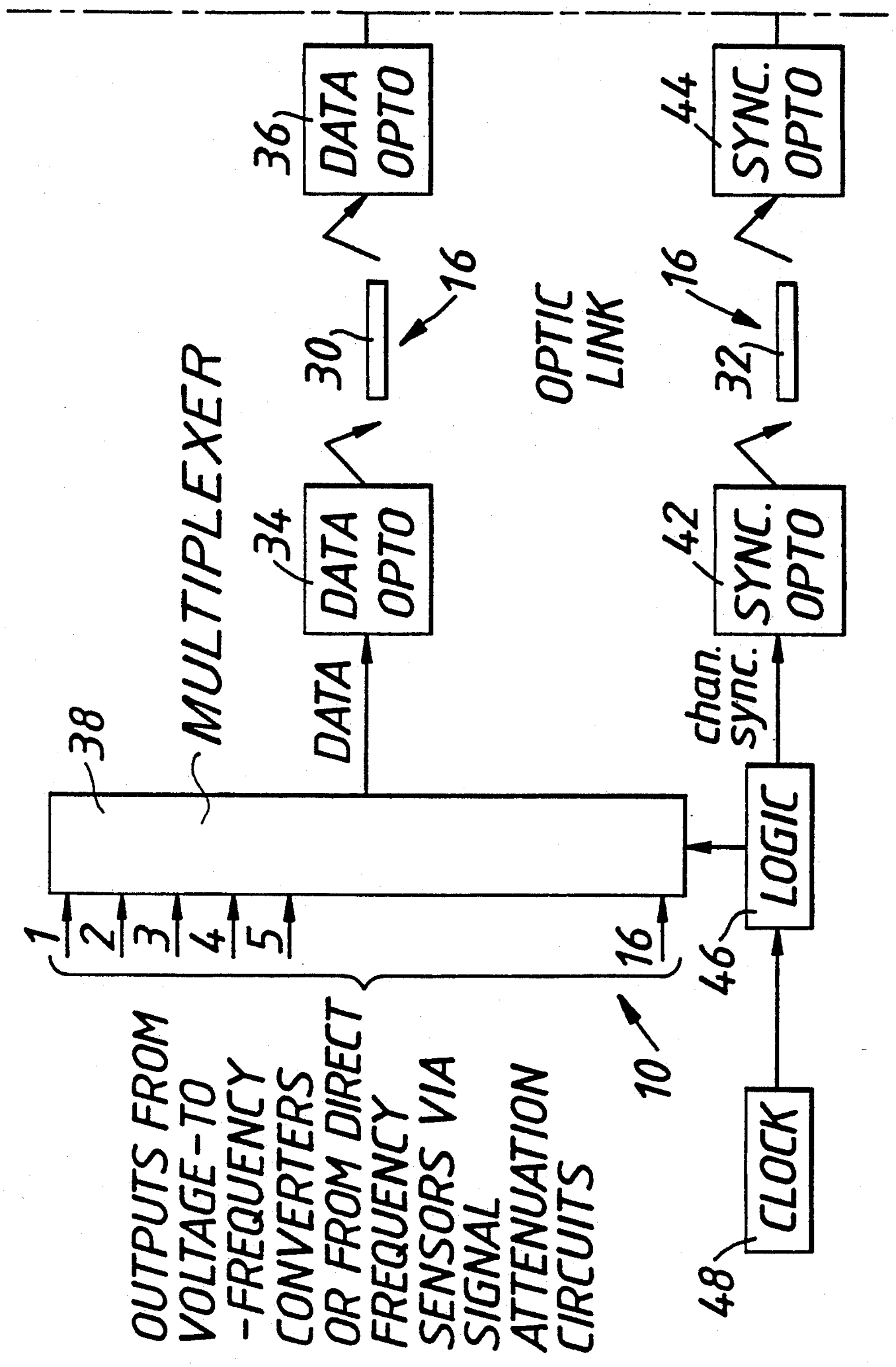
FIGS. 2A and 2B are part-figures which taken together show is a block diagram showing the fibre optic data link.
Figure 2B:
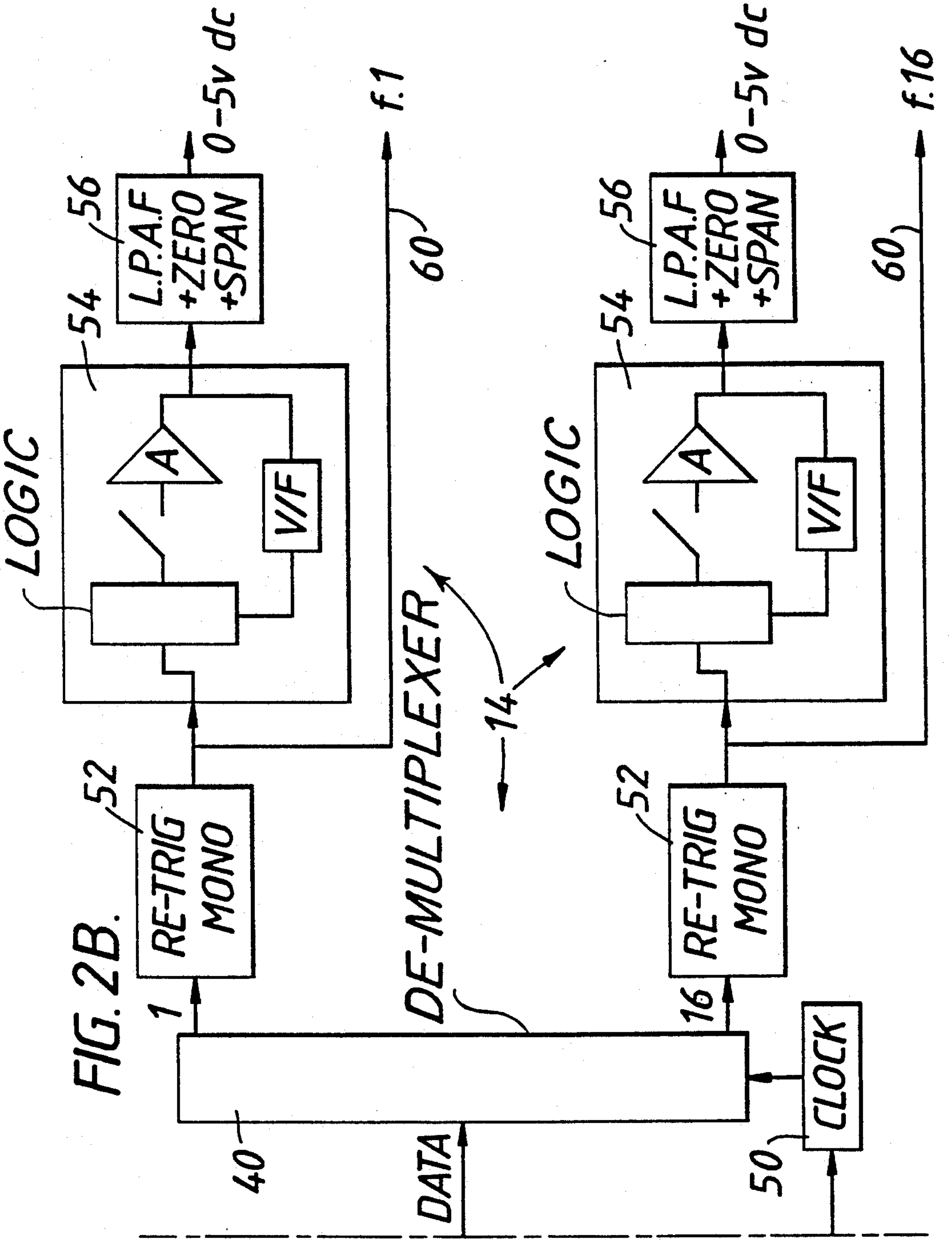

FIGS. 2A and 2B, taken together, show the fibre optic link 16. It consists of a two-core fibre optic cable 30, 32, the core 30 linking a fibre optic transmitter 34.

The master transmitter 10 comprises a multiplexer 38 feeding the fibre optic transmitter 34. The master receiver receives data from the fibre optic receiver 36.

The core 32 links a synchronisation transmitter 42 to a synchronisation receiver 44. The synchronisation transmitter 42 is connected to a logic circuit 46 controlling the multiplexer 38 and the circuit 46 is controlled by a clock 48, which drives the logic circuit 46 and the multiplexer 38. The synchronisation receiver 44 is connected to the demultiplexer 40 via a second clock 50, which controls the demultiplexer 40.

The demultiplexer 40 has up to sixteen receiver channels, each connected to a re-triggering monostable 52 which feeds a phase-locked loop 54. The loop 54 feeds a low-pass active filter 56 which also comprises zero and span potentiometers (not shown). The low-pass filter 56 removes the multiplexed noise. The zero and span potentiometers set the final output between 0 volts and 5 volts. The outputs of the receiver are used to drive computers, chart recorders etc. In addition to the sixteen analogue outputs, sixteen re-constituted frequency signals are also available at 60.

The voltage-to-frequency converters (FIGS. 3A and 3B) produce square-wave frequencies with a nominal range of 20 kHz to 100 kHz. The multiplexer 38 operates at 5 MHz in time division multiplex mode and samples each period of frequency at least twice on all channels. The demultiplexer 40 "time-stretches" the pulses it receives from the multiplexer 38 to produce pulses of the same width (plus or minus an error factor) as those emitted by the voltage-to-frequency converters.

Figure 3A:
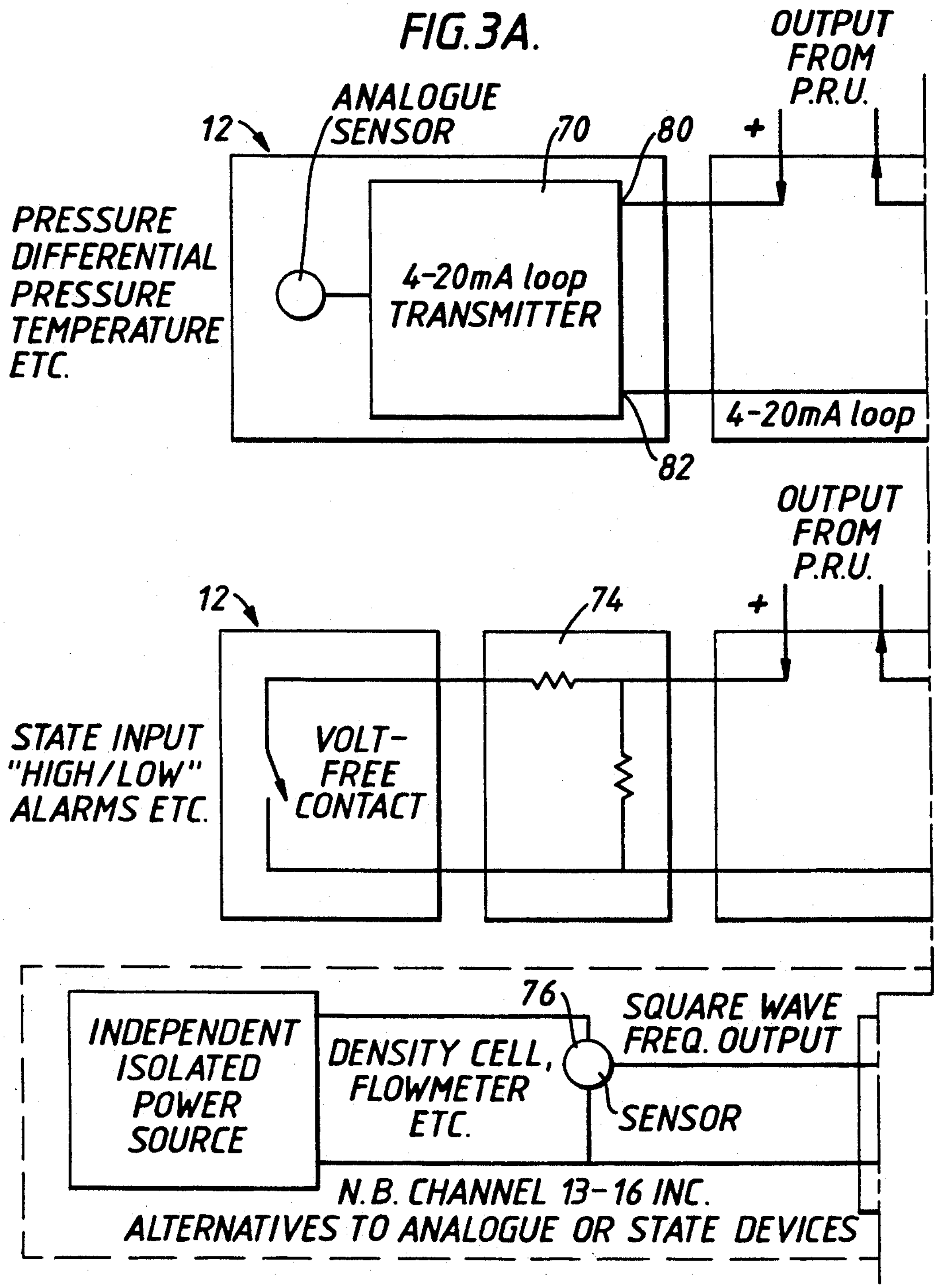
FIGS. 3A and 3B are part-figures which taken together show a block diagram showing details of energisation of the loop transmitters.
Figure 3B:
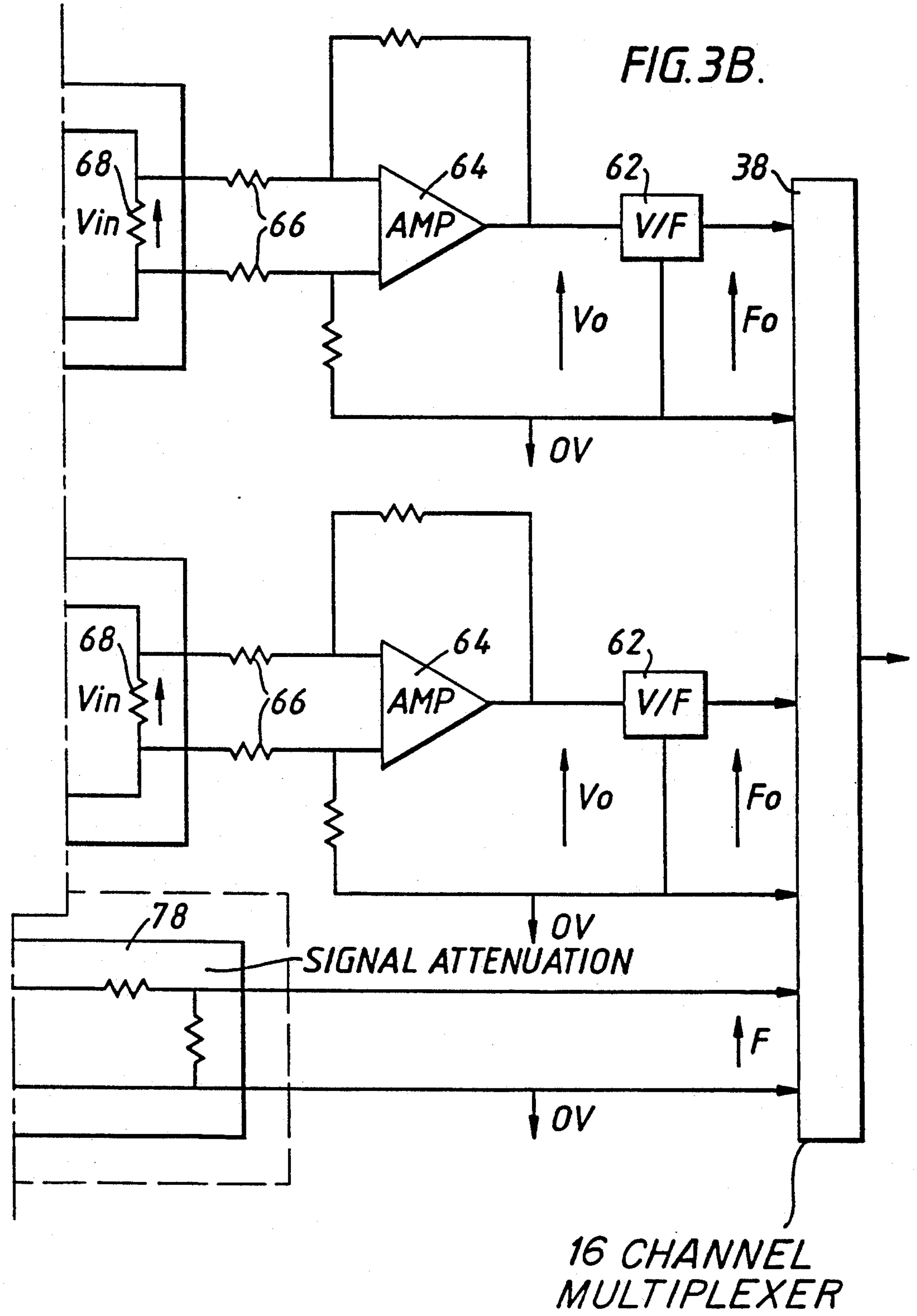

The voltage-to-frequency converters are shown at 62 in FIGS. 3A and 3B.

Each sensor 12 (or state input) produces a current output of 4–20 mA. These currents are converted over the range 0.200 v dc to 1.00 v dc by a 50 ohm precision resistor 68 to give a V-in signal. These signals are buffered by operational amplifiers 64 and 100 k-ohm matched tolerance precision resistors 66. The resistors 66 also provide common mode voltage rejection.

In the case of analogue sensors 12, the output signal is generated using a 4–20 mA loop transmitter 70. In the case of state sensors 12, the loop equivalent comprises 2 attenuating resistors 74.

The last 4 channels, if preferred, can have a sensor 76 which gives a square wave frequency output directly. The output is passed through an attenuator 78.

Figure 4:
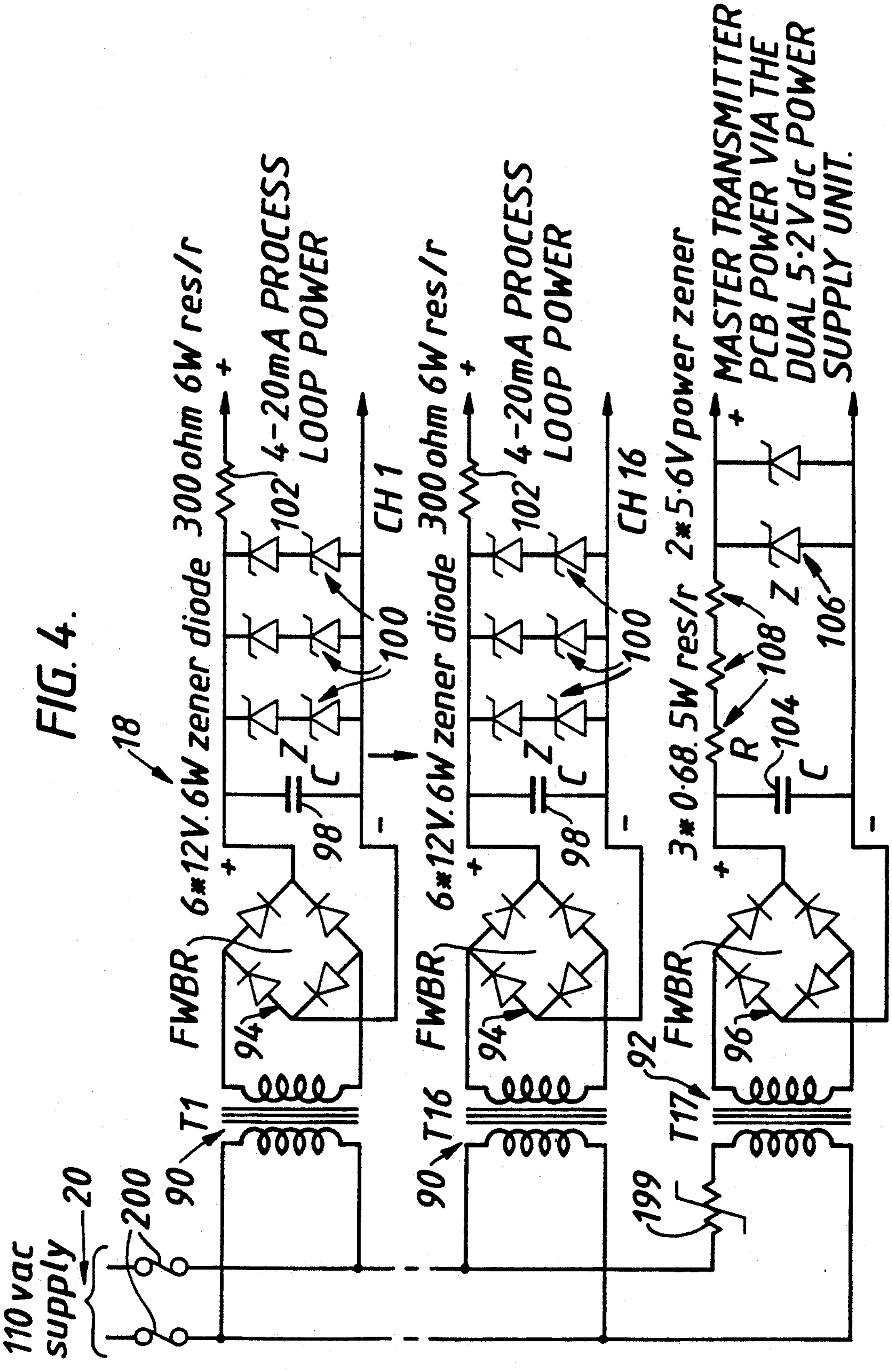
FIG. 4 is a simplified circuit diagram showing the power restrictor unit.

Each loop transmitter 70 is energised from power restrictor unit 18 shown in FIG. 1 and shown in greater detail in FIG. 4. One output side of the power restrictor unit 18 is connected to one output terminal 80 of the loop transmitter 70. The other output side of the power restrictor unit 18 is connected to one end of the resistor 68, the other end of which is connected to the other output terminal 82 of the loop transmitter 74.

Thus it can be seen that the primary loop transmitter circuit or primary state input circuit produces an analogue output in the form of a current from which a frequency signal Fo is derived by the secondary circuit on the pcb 19. The frequency signal is fed to the multiplexer 38. Both the primary and the secondary circuits are energised by the power restrictor unit 18.

FIG. 4 shows the power restrictor unit 18 in more detail. It comprises sixteen transformers 90 and a transformer 92. Each transformer 90, 92 has its primary winding connected across the ac mains 20 and its secondary winding feeding a full-wave rectifier bridge 94 (in the case of transformer 92).

In the case of the sixteen data channels power is taken from the output of the rectifier bridge 94 and is fed to the loop transmitter 70 (or attenuator 74). The output from the rectifier bridge 94 is smoothed by a capacitor 98 connected across the bridge output. Then follows three pairs of 12 v (5 w) Zener diodes 100 also connected across the bridge output, which in the event of a mains over-voltage clamp the dc output to 24 v. A 300 ohm (6 w) resistor 102 in series with the bridge output (in the positive line) limits the output of the bridge.

The output from the bridge is 18 v dc (on-load) at 100 v ac mains supply. The sixteen channels are thus independently supplied, the transformers providing channel/channel galvanic isolation.

The seventeenth rectifier bridge 96 provides power to operate the master transmitter printed circuit-board via a dual output 5.2 v dc power supply unit (not shown) on which the amplifier 64 and voltage to frequency converters 62 are mounted. The output from the bridge 96 is smoothed by a capacitor 104. In the event of a mains over-voltage, the output is clamped to 5.6 v by a parallel combination of two high power (5.6 v) Zener diodes 106. Output current is limited by three 0.68 ohm (6 w) power resistors 108.

The transformers 90 are designed to be inherently short-circuit proof. The transformer 92 is over-temperature protected by means of an embedded thermal cut-out device 199 (FIG. 4).

Instead of using a 110 v ac single-phase mains supply (as shown) it would be possible to use a 24 v battery operated inverter, sited in a safe area.

The circuit components described above, incorporating amplifiers 64 and the voltage-to-frequency converters 62 are made intrinsically safe by a combination of safety techniques, including encapsulation.

The power restrictor unit 18 is also "potted" in a single block, containing the seventeen small transformers 90, 92 and associated components. The outputs are intrinsically safe. Mains supply protection is by two external, high-rupturing capacity (HRC) fuses 200 (FIG. 4).

I claim:

1. A data transmission system comprising:

primary sensing circuits to be located in a hazardous environment:

a master transmitter to be located in a hazardous environment;

a master receiver to be located in a safe environment having a demultiplexer; and a fiber optic data link connecting said master transmitter and said master receiver, said master transmitter including a power restrictor unit, secondary circuits receiving analog signals output from said primary sensing circuits, and a multiplexer for receiving frequency signals derived by said secondary circuits from analog outputs from said primary sensing circuits and for outputting signals to said demultiplexer over said fiber optic data link, said power restrictor unit supplying energy to said primary and said second circuits, said frequency signals being produced by voltage-to-frequency converters in said secondary circuits, each converter being driven by a voltage originally developed across a respective resistor in a respective primary sensing circuit; and said power restrictor unit comprising a respective power supply for each of said primary sensing circuits, each said power supply comprising first and second sides, said first side being connected to one end of the corresponding primary sensing circuit and said second side being connected to one end of the resistor forming the other end of said corresponding primary sensing circuit.

2. A data transmission system comprising:

primary sensing circuits outputting analog signals in the form of currents;

a master transmittor;

a master receiver having a demultiplexer; and a fiber optic data link connecting said master transmitter and said master receiver, said master transmitter including a power restrictor unit including a respective power supply for each of said primary sensing circuits, secondary circuits receiving said analog signals output from said primary sensing circuits, said secondary circuits comprising voltage-to-frequency converters, each converter being driven by a voltage originally developed across a respective resistor in a respective primary sensing circuit, and a multiplexer for receiving frequency signals derived by said secondary circuits from analogs outputs from said primary sensing circuits and for outputting signals to said demultiplexer over said fiber optic data link, said power restrictor unit supplying energy to said primary and said second circuits and said power supply comprising two sides, one side being connected to one end of said primary sensing circuit and the other side being connected to one end of said resistor forming the other end of said primary sensing circuit.

3. A system according to claim 2, wherein said primary sensing circuits comprise intrinsically safe process loop transmitter circuits or state input circuits.

4. A system according to claim 2, the power restrictor unit comprising for each loop transmitter circuit, staring from a mains AC supply:

a transformer;

a full-wave bridge rectifier;

a capacitor connected across the output of said rectifier;

a series of pairs of Zener diodes connected across the output of said rectifier; and a current-limiting resistor on one side of the output of said rectifier.

5. A system according to claim 2, the power restrictor unit comprising for the master transmitter, starting from the main AC supply, a transformer, a full-wave bridge rectifier, a capacitor connected across the output of the rectifier, in one side of the output current-limiting resistors, and a series of Zener diodes connected across the output of the rectifier.

6. A system according to claim 2, wherein said master transmitter includes a synchronization transmitter, said master receiver includes a synchronization receiver, and said fiber optic data link includes a core connecting said synchronization transmitter and said synchronization receiver.

* * * * *